(12) United States Patent
Wittke et al.

(10) Patent No.: US 9,756,287 B2
(45) Date of Patent: *Sep. 5, 2017

(54) SYSTEM AND METHOD FOR PROVIDING A TWO-WAY INTERACTIVE 3D EXPERIENCE

(71) Applicant: HEWLETT-PACKARD DEVELOPMENT COMPANY, L.P., Houston, TX (US)

(72) Inventors: Bradley Wittke, Palo Alto, CA (US); Nelson L. Chang, San Jose, CA (US); Henry Sang, Jr., Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/337,908

(22) Filed: Oct. 28, 2016

(65) Prior Publication Data

US 2017/0048491 A1 Feb. 16, 2017

Related U.S. Application Data

(63) Continuation of application No. 14/743,541, filed on Jun. 18, 2015, now Pat. No. 9,516,270, which is a
(Continued)

(51) Int. Cl.
*H04N 7/14* (2006.01)
*G06F 3/14* (2006.01)
(Continued)

(52) U.S. Cl.
CPC ........... *H04N 7/147* (2013.01); *G06F 3/1446* (2013.01); *H04N 7/142* (2013.01); *H04N 13/02* (2013.01); *H04N 13/0447* (2013.01)

(58) Field of Classification Search
CPC combination set(s) only.
See application file for complete search history.

(56) References Cited

U.S. PATENT DOCUMENTS 5,317,393 A 5/1994 Lee
6,545,685 B1 4/2003 Dorbie
(Continued)

FOREIGN PATENT DOCUMENTS

KR 20110107692 A 10/2011

OTHER PUBLICATIONS

Baker, Harlyn et al., "Capture and Display for Live Immersive 3D Entertainment", Copyright 2011, 4 pgs.
(Continued)

*Primary Examiner* — Joseph J Nguyen
(74) *Attorney, Agent, or Firm* — Dicke, Billig and Czaja

(57) ABSTRACT

A system for providing a two-way interactive 3D experience includes a first video capture system configured to capture a first set of images of a first person in a first location, and a first display system in the first location. A second video capture system is configured to capture a second set of images of a second person in a second location. A second display system is in the second location. A two-way communication link is configured to deliver the first set of images to the second display system for display and deliver the second set of images to the first display system for display. The second display system is configured to generate a substantially life-sized 3D display of the first person based on the first set of images.

19 Claims, 10 Drawing Sheets

Related U.S. Application Data continuation of application No. 13/459,792, filed on Apr. 30, 2012, now Pat. No. 9,094,570.

(51) Int. Cl.
*H04N 13/02* (2006.01)
*H04N 13/04* (2006.01)

(56) References Cited

U.S. PATENT DOCUMENTS

| | | |
|---|---|---|
| 7,306,341 B2 | 12/2007 | Chang |
| 7,443,364 B2 | 10/2008 | Damera-Venkata et al. |
| 8,069,095 B2 | 11/2011 | Glazer et al. |
| 8,319,819 B2 | 11/2012 | MacDonald |
| 2005/0259036 A1 | 11/2005 | Callegari |
| 2007/0070177 A1 | 3/2007 | Christensen |
| 2007/0091277 A1 | 4/2007 | Damera-Venkata et al. |
| 2007/0097334 A1 | 5/2007 | Damera-Venkata et al. |
| 2008/0002160 A1 | 1/2008 | Chang et al. |
| 2008/0024469 A1 | 1/2008 | Damera-Venkata et al. |
| 2008/0024683 A1 | 1/2008 | Damera-Venkata et al. |
| 2008/0143978 A1 | 6/2008 | Damera-Venkata et al. |
| 2009/0015651 A1 | 1/2009 | Togami et al. |
| 2009/0021496 A1 | 1/2009 | Silzars |
| 2009/0319058 A1 | 12/2009 | Rovaglio et al. |
| 2010/0128112 A1 | 5/2010 | Marti et al. |
| 2010/0149305 A1 | 6/2010 | Catchpole et al. |
| 2010/0180313 A1 | 7/2010 | Bi |
| 2010/0207874 A1 | 8/2010 | Yuxin et al. |
| 2010/0225732 A1 | 9/2010 | De Beer et al. |
| 2010/0231699 A1 | 9/2010 | Jalbout |
| 2010/0245535 A1 | 9/2010 | Maunchly |
| 2011/0004481 A1 | 1/2011 | Jones |
| 2011/0255802 A1 | 10/2011 | Kameyama et al. |
| 2012/0105742 A1 | 5/2012 | Davis et al. |
| 2012/0147129 A1 | 6/2012 | Tucker et al. |
| 2012/0242777 A1 | 9/2012 | Yu et al. |
| 2013/0083906 A1 | 4/2013 | Roberts et al. |
| 2013/0162752 A1 | 6/2013 | Herz et al. |

OTHER PUBLICATIONS

Damera-Venkata, N. et al., "A Unified Paradigm for Scalable Multi-Projector Displays," IEEE Trans on Visualization and Computer Graphics, V. 13(6), 2007 (8 pages).

SYSTEM AND METHOD FOR PROVIDING A TWO-WAY INTERACTIVE 3D EXPERIENCE

CROSS-REFERENCE TO RELATED APPLICATIONS

This application is a continuation of U.S. patent application Ser. No. 14/743,541, filed on Jun. 18, 2015, which is a continuation of U.S. patent application Ser. No. 13/459,792, filed on Apr. 30, 2012, which are both hereby incorporated by reference in their entirety.

BACKGROUND

Multiple projector systems have been developed to project multiple video images to a common display location, such as a screen or wall, to produce a composite display. A composite display is one in which a single image is produced using multiple projectors, with each projector producing a portion or component of the total image. These display systems can be configured to allow multiple sub-frames to overlap completely, not at all, or anything in between, or to provide multiple separate composite images. Yet another application for a multiple projector system is the production of three-dimensional ("3D") images.

One challenge associated with composite images is consistent reproduction of color, brightness, etc., across multiple displays or multiple channels on the same display. For example, brightness and color intensity can vary within each individual portion of a composite display, with the result that the composite image has noticeable irregularities. It can also be difficult to calibrate and reconfigure multiple projector systems between various display configurations, such as to allow content to flow across multiple screens in a single display, while also providing consistent brightness, color, etc. Additionally, the production of 3D images using a multiple projector system has typically been complicated and difficult.

For these and other reasons, a need exists for the present invention.

DETAILED DESCRIPTION

Figure 1:
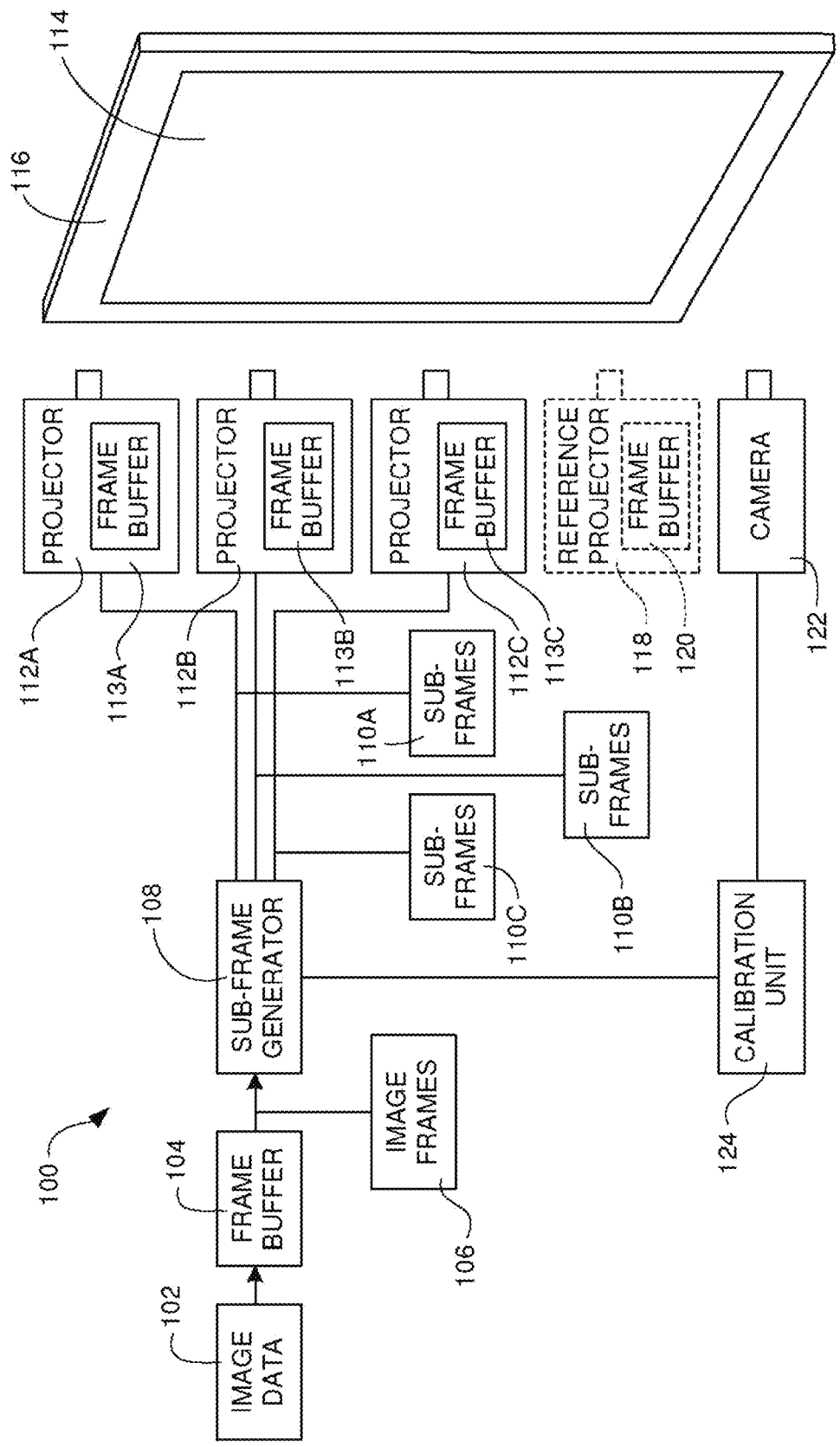
FIG. 1 is a block diagram illustrating an image display system configured to produce a composite image using multiple projectors.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

As used herein, the term "sub-frame" refers to that portion of a display image that is produced by a single projector. A complete display image produced by multiple sub-frames from multiple projectors is referred to as a "composite image." It is to be understood that a composite image can be produced by a sub-group of projectors (i.e. fewer than all of the projectors) in a multiple projector system.

One embodiment is directed to a system and method that uses 3D displays and cameras to create life-sized and natural aspect ratio "celebrity wall" experiences for immersive entertainment. One embodiment uses 3D display(s) and 3D camera(s) to create a life-sized, life-like 3D experience between at least two geographically dispersed locations (e.g., rooms in different buildings, different cities, different states, and/or different countries). One embodiment leverages natural aspect ratios to provide a more immersive and interactive experience between people located at geographically dispersed locations, such as a celebrity and his/her fans.

Some embodiments include creating life-sized superwide displays that provide a just-like-being-there 3D courtside experience at a basketball game or life-sized displays that demonstrate various 3D views of a clothing line for fashion/retail. Some embodiments augment these experiences by creating life-sized 3D displays of a more natural aspect ratio that enable talent (e.g. celebrities, athletes, artists, and VIPs) to reach a much larger and more geographically dispersed audience. Furthermore, two-way 3D celebrity walls (including life-sized 3D displays and 3D cameras) enable the sports athlete or artist to talk to fans virtually, as though just like being there. In some embodiments, this is expanded to support multiple locations, positioned and architected to make the virtual experience look natural. One embodiment extends the reach of the celebrity, drastically reduces travel costs, and creates a more compelling virtual experience. The system can also be a key differentiator to help with sales support, with lead designer(s) being able to talk through dress design with potential high end customers, showing one-of-a-kind dresses located in a different part of the world.

To achieve the life sizes for an immersive 3D display, one embodiment leverages multiple projectors to create a high quality, high resolution, seamless, and yet cost effective solution. Similarly, multiple cameras are used to capture imagery with appropriate resolution and aspect ratio. Empirically, there is a more natural experience and an almost-life-like feeling when viewing images of people between 80% to 120% actual size, in contrast to imagery on displays of typical sizes and aspect ratios. Moreover, scaling to the correct size and utilizing 3D encourages so-called visual grazing to further create an immersive experience.

Some embodiments allow special guests the opportunity to interact with talent in ways they have never experienced before. Utilizing life-sized displays and 3D cameras, when the special guests interact with the talent, they will have a true-to-life experience and the feeling of actually meeting them in-person, without the talent actually being in the same location.

In one embodiment, the primary fan site consists of a multi-projector 3D display system in a size and aspect ratio that are appropriate for the talent. For example, the display would be about 5'×8' to create a life-like experience of interacting with a professional athlete. The display solution creates a seamless 3D display in the appropriate aspect ratio. Geometric and color differences among the projectors are automatically corrected to deliver a high quality result. Likewise, on the celebrity side, two or more cameras are used to form the appropriate 3D imagery in an appropriate aspect ratio. For example, for a more portrait oriented display, two portrait oriented high-definition (HD) cameras are used to capture portrait oriented HD 3D imagery. Providing different aspect ratios involves using additional cameras to stitch and blend the various camera images to form the appropriate left-right eye pair matched to the display aspect ratio.

To create a two-way experience, additional displays and cameras are used for full duplex. 3D portals are used in one embodiment for each additional fan site. On the talent side, the viewing experience may be 2D or 3D. Connection among the different sites may be facilitated using video networks (e.g., multiple fiber/HD-SDI links) or data networks. Audio (microphones and speakers, including possibly directional) at each site is managed and interconnected. To create a natural multi-site experience, the positioning of the walls, the cameras, and the participants' relative views, are all taken into account. In one embodiment, the cameras are positioned with respect to the walls in such a way to maximize eye contact among sites.

"Portrait wall" or "celebrity wall" embodiments of different sizes have been constructed, up to 9' tall, using 3D display systems with 6-8 projectors seamlessly blended and tiled together, coupled with two portrait oriented cameras to create a live two-way 3D capture and display system with audio.

One embodiment facilitates a real-like 3D video communication between the celebrity/talent site and the fan site(s). It also could be designed to enable a one-to-many experience, so that the talent could be interacting with multiple fan sites simultaneously. The "fan" experience is life-sized (life-like and immersive) and uses a natural aspect ratio (more portrait appropriate for a single person). Many applications include sports, concerts, gaming, and fashion/retail. This is a unique benefit for the talent and special guests. The talent will be able to reach out to more people and the special guests will have greater access.

One embodiment uses scalable camera and projector arrays to deliver high quality, life-sized, immersive content. In contrast to standard entertainment formats such as 16:9 HD and 2.35:1 cinema, other aspect ratios are used to bring an enhanced 3D experience. One embodiment uses a wider panoramic 5:1 view with sufficient resolution to deliver the entire field of view (e.g., the full length of a basketball court or the breadth of a concert stage), which gives a closer approximation to the in-arena experience. The fan watches the action move across the screen rather than having the screen follow the action. As with the real venue, they are free to let their eyes explore—to the scoreboard, players on the sidelines, cheerleaders, other local attendees, etc., all with sufficient resolution to be naturally drawn into the 3D scene.

Scenarios for the techniques described herein include, for example, the following: (1) Enticement for season ticket holders, to interact with their favorite player; (2) an opportunity for VIPs to have special access; (3) celebrity Meet and Greet; (4) Interviews; and (5) pre-game and post-game chalk talks. People that would be interested in using the techniques described herein would include, for example, the following: (1) Fans wanting to "meet" their favorite player/performer; (2) team owners wanting to enhance their fan experience; (3) event organizers who want a unique experience for their customers; (4) corporate marketing people, who may use this to entice their clients; (5) performers who want to interact with their fan base to help sell albums or tickets.

FIG. 1 is a block diagram illustrating a prior art multi-projector image display system 100 suitable for use in various embodiments described herein. The image display system 100 processes image data 102 and generates a corresponding displayed image 114. The displayed image 114 is defined to include any pictorial, graphical, or textural characters, symbols, illustrations, or other representations of information.

In one embodiment, the image display system 100 includes an image frame buffer 104, a sub-frame generator 108, projectors 112A-112C (collectively referred to as projectors 112), camera 122, and a calibration unit 124. The image frame buffer 104 receives and buffers image data 102 to create image frames 106. The sub-frame generator 108 processes the image frames 106 to define corresponding image sub-frames 110A-110O (collectively referred to as sub-frames 110). In one embodiment, for each image frame 106, the sub-frame generator 108 generates one sub-frame 110A for projector 112A, one sub-frame 110B for projector 112B, and one sub-frame 110O for projector 112O. The sub-frames 110A-110C are received by the projectors 112A-112O, respectively, and stored in the image frame buffers 113A-113O (collectively referred to as image frame buffers 113), respectively. The projectors 112A-112C project the sub-frames 110A-110C, respectively, onto the target surface 116 to produce the displayed image 114 for viewing by a user.

The image frame buffer 104 includes memory for storing image data 102 for one or more image frames 106. Thus, the image frame buffer 104 constitutes a database of one or more image frames 106. The image frame buffers 113 also include memory for storing sub-frames 110. Examples of image frame buffers 104 and 113 include non-volatile memory (e.g., a hard disk drive or other persistent storage device) and may include volatile memory (e.g., random access memory (RAM)).

The sub-frame generator 108 receives and processes image frames 106 to define a plurality of image sub-frames 110. The sub-frame generator 108 generates sub-frames 110 based on the image data in image frames 106. In one embodiment, the sub-frame generator 108 generates image sub-frames 110 having a resolution that matches the resolution of the projectors 112, which is less than the resolution of image frames 106 in one embodiment. The sub-frames 110 each include a plurality of columns and a plurality of rows of individual pixels representing a subset of an image frame 106.

The projectors 112 receive image sub-frames 110 from the sub-frame generator 108 and, in one embodiment, simultaneously project the image sub-frames 110 onto the target surface 116 at overlapping and/or spatially offset positions to produce the displayed image 114. In one embodiment, the display system 100 is configured to give the appearance to the human eye of high-resolution displayed images 114 by displaying overlapping lower-resolution sub-frames 110 from multiple projectors 112. These overlapping sub-frames can be spatially shifted or have arbitrary geometric transformations with respect to one another. In one embodiment, the projection of overlapping sub-frames 110 gives the appearance of enhanced resolution (i.e., higher resolution than the sub-frames 110 themselves). Approaches have been developed for determining appropriate values for the sub-frames 110 so that the resulting displayed image 114 produced by the projected sub-frames 110 is close in appearance to how the high-resolution image (e.g., image frame 106) from which the sub-frames 110 were derived would appear if displayed directly.

It will be understood by a person of ordinary skill in the art that the functions performed by the sub-frame generator 108 may be implemented in hardware, software, firmware, or any combination thereof. The implementation may be via a microprocessor, programmable logic device, or state machine. Components of the system may reside in software on one or more computer-readable media devices. The term computer-readable media as used herein is defined to include any kind of memory, volatile or non-volatile, such as floppy disks, hard disks, CD-ROMs, flash memory, read-only memory, and random access memory.

Also shown in FIG. 1 is reference projector 118 with an image frame buffer 120. The reference projector 118 is shown in hidden lines in FIG. 1 because, in one embodiment, the projector 118 is not an actual projector, but rather is a hypothetical high-resolution reference projector that is used in an image formation model for generating optimal sub-frames 110. In one embodiment, the location of one of the actual projectors 112 can be defined to be the location of the reference projector 118. The display system 100 can also include a camera 122 and a calibration unit 124, which can be used to automatically determine a geometric mapping between each projector 112 and the reference projector 118.

The image display system 100 can include hardware, software, firmware, or a combination of these. In one embodiment, one or more components of the image display system 100 (e.g. the frame buffer 104, sub-frame generator 108 and calibration unit 124) are included in a computer, computer server, or other microprocessor-based system capable of performing a sequence of logic operations. Such a system is generally referred to herein as a "controller" for the multi-projector system. In addition, processing can be distributed throughout the system with individual portions being implemented in separate system components, such as in a networked or multiple computing unit environment (e.g. clustered computers).

While the embodiment shown in FIG. 1 includes three projectors, and one camera, these quantities of components are only exemplary. For example, another embodiment of a multi-projector system 200 is shown in pictorial form in FIG. 2. This embodiment includes twelve projectors 202a-1, all oriented to produce a single composite image 204 on a display surface 206. As shown in this example, the twelve projectors produce twelve sub-frames, labeled 208a-1, which in this figure are combined together to provide a single wide format composite image 204. While the superimposed sub-frames 208 are shown spatially offset from each other in FIG. 2, this is for illustrative purposes, and does not necessarily correspond to the actual positioning of sub-frames to produce the composite image 204. It is also to be appreciated that the actual physical location or grouping of projectors in a multi-projector system can vary. For example, while the projectors 202 in FIG. 2 are physically arranged in three groups of four and the sub-frames on the display are generally in three groups of four, the projectors could be arranged in a different physical position, and any of the twelve projectors 202a-l can be configured to produce any one of the twelve sub-frames 208a-l.

The twelve projectors 202 are controlled by a controller system, which can be a computer, computer server, or other microprocessor-based system capable of driving the projectors to produce the composite image, as discussed above. The controller is designated generally at 210. However, as noted above, the controller system can include multiple computing devices, such as a first controller computer 210 and a second controller device 212 that is networked or clustered with the first controller computer. Similarly, the system 200 in FIG. 2 includes a camera 214 for feedback and adjustment of the projectors 202, but can also include multiple additional cameras 216, 218, which also provide feedback to the calibration unit (124 in FIG. 1) that is associated with the controller 210 or clustered controller group.

Figure 2:
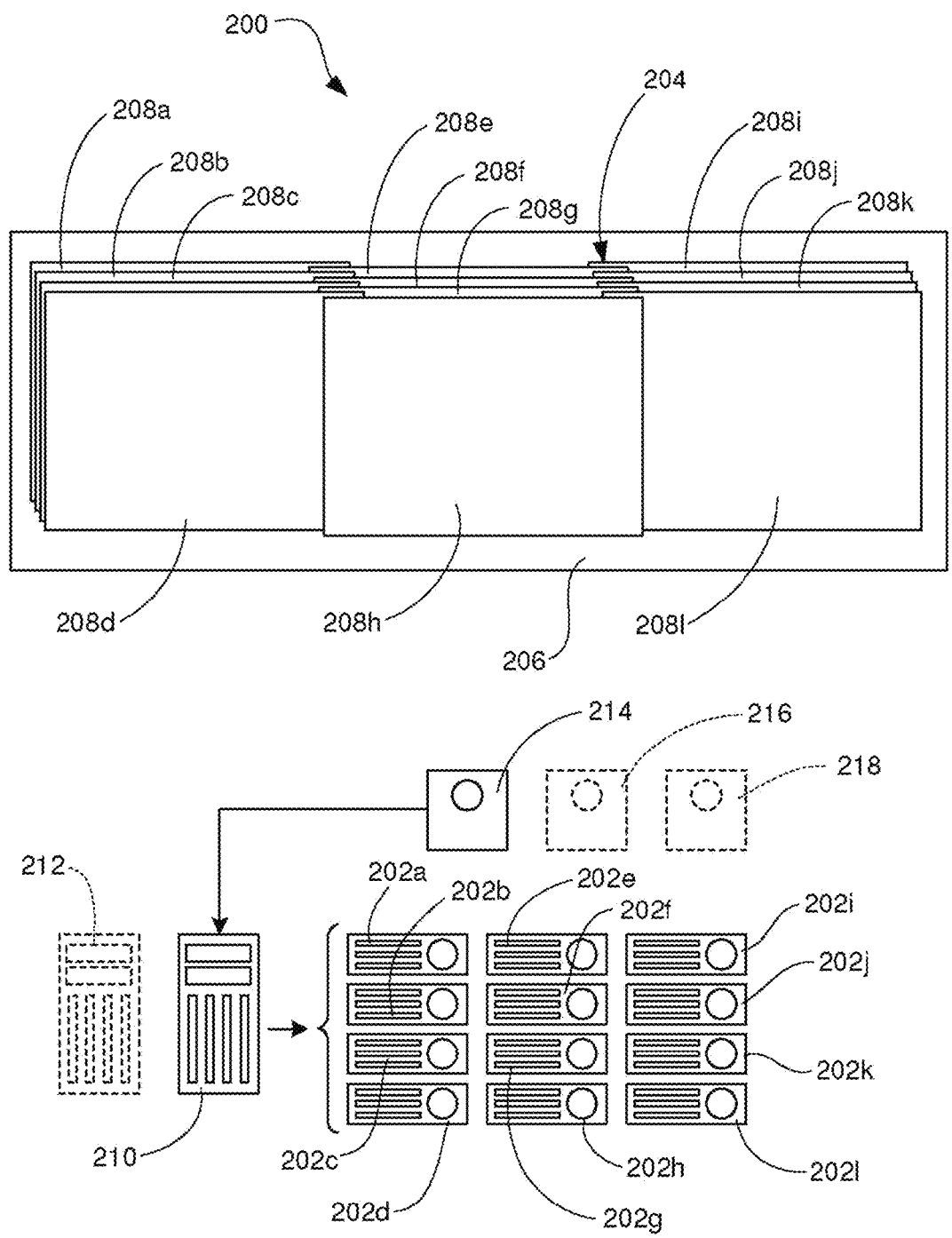
FIG. 2 is a diagram illustrating a multi-projector system and a composite display produced thereby according to one embodiment.
Figure 3:
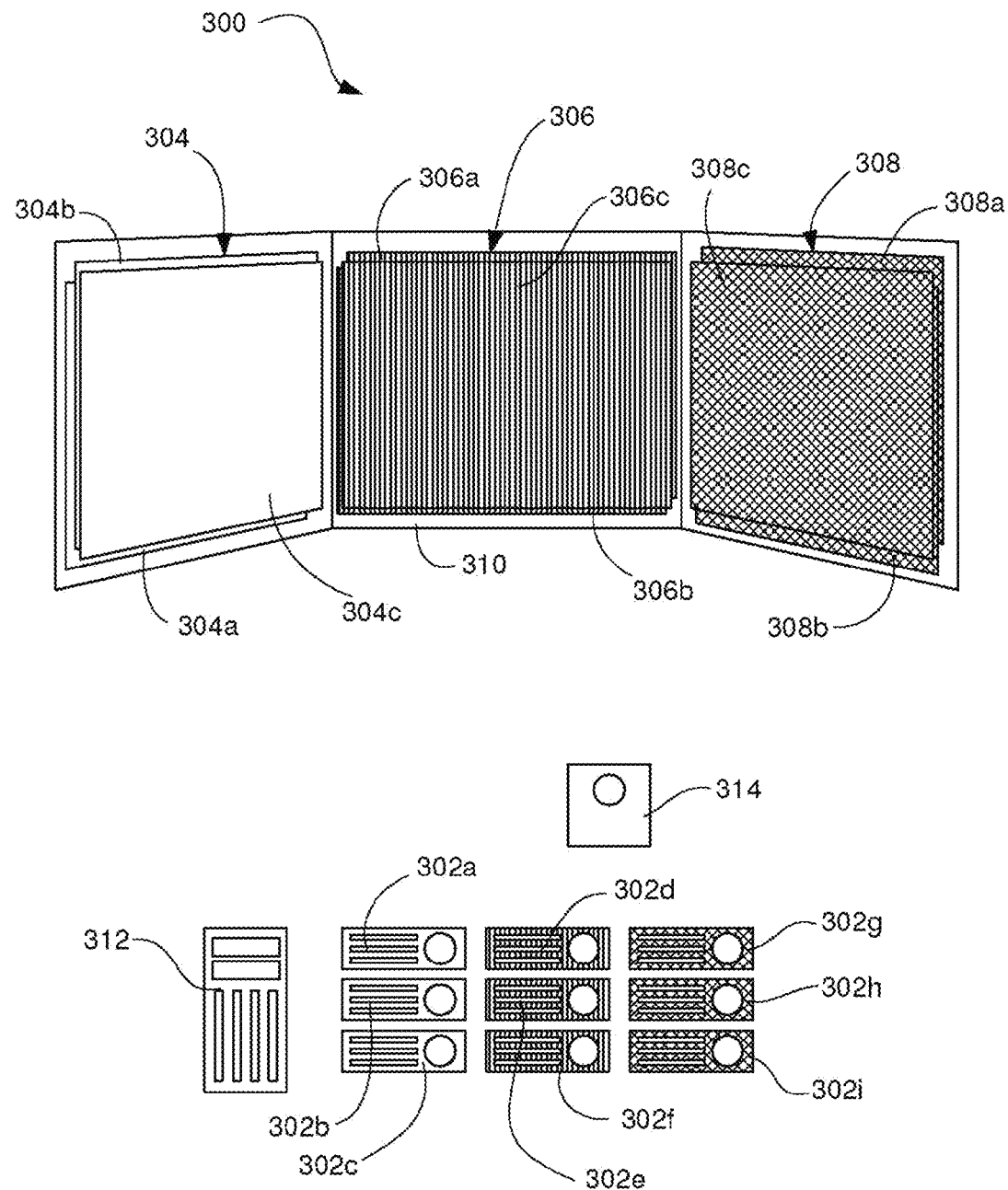
FIG. 3 is a diagram illustrating a multi-projector system and display in which the projectors are divided into multiple sub-groups, to produce multiple composite images on a bent backdrop-type screen according to one embodiment.

The multi-projector systems in FIGS. 1 and 2 are shown producing a single composite image using all available projectors. However, it has been found that it can be desirable to divide a group of projectors in a multi-projector system into sub-groups. Shown in FIG. 3 is an embodiment of a multi-projector system 300 in which the projectors 302 are divided into sub-groups, to produce multiple composite images 304, 306, 308 on a bent backdrop-type screen 310. While this screen is shown as including three connected portions, it could alternatively include multiple separate surfaces, each one addressed by a different sub-group. In this case, a first sub-group of three projectors 302a-c provide three sub-frames 304a-c that produce composite image 304, a second sub-group of three projectors 302d-f provide three sub-frames 306a-c that produce composite image 306, and a third sub-group of three projectors 302g-i provide three sub-frames 308a-c that produce composite image 308. While the embodiment shown in FIG. 3 includes three screens, any number of multiple screens can be used. These multiple composite images 304, 306, 308 can be produced using a single microprocessor controller system 312 (whether a single computer device, or multiple computers or devices that are networked or clustered together), and can be related images or independent images. The multiple composite images can represent multiple composite displays or multiple channels on the same composite display. At least one camera 314 can be oriented toward the display screen 310 to provide feedback to a calibration unit (not shown) associated with the controller 312, in the manner discussed above.

As noted above, one challenge associated with producing composite images is consistent reproduction of color, brightness, etc., across multiple composite displays or multiple channels on the same composite display. This is particularly an issue where these displays are produced using a single microprocessor system. It is generally desirable that a composite display (as in FIG. 2) or group of composite displays (as in FIG. 3) have the same visual characteristics throughout (e.g. consistent brightness, color). For example, it can be distracting for one image in a multi-screen display or one eye in a stereoscopic/3D display to differ in color or brightness. Likewise, it can be undesirable if a multi-screen signage display having content that flows across the screens exhibits differing brightness and/or color across the different screens.

Advantageously, the present disclosure provides various embodiments of a system and method that have been developed to allow automatic delivery of consistent imagery (e.g. consistent brightness, color, etc.) using a multi-projector composite display system across multiple screens and/or multiple channels. This system and method is also useful for 3D applications. There are different techniques for displaying stereoscopic 3D images. As is well known, stereoscopic 3D images involve left and right image pairs that are slightly different in perspective. When a viewer sees one image of the pair with the left eye and the other with the right eye (typically with the aid of special polarized or color filter glasses), the effect can approximate actual human stereoscopic vision of three dimensional objects.

Some 3D projectors use time multiplexing to alternately display two channels corresponding to left and right images. While these images can be consistent in color and brightness (because they are produced by the same projector), this is often obtained in a trade-off of bit depth and overall brightness. These types of projectors can also be very expensive. Alternatively, dual projectors can be used for stereoscopic 3D images. One projector will project the left image and the other will project the right image. Dual projector systems often require manual calibration and alignment, as well as balancing luminance and color so that the two channels are consistent. These tasks generally require the services or highly trained technicians, and can be time consuming. Also, these dual projector solutions typically have a fixed aspect ratio, fixed resolution, and fixed brightness.

Many prior 3D approaches can deliver at most two distinct views, and/or involve the use of 3D glasses. However, those of skill in the art will recognize that some systems can be multi-view (i.e. deliver more than two views), and that autostereoscopic (not requiring glasses) displays are also available. Autostereoscopic displays are commonly multi-view, and as a user moves his viewing position from side to side with respect to the display, the eyes receive a more appropriate pair of views to give a stereo/3D view. These displays are limited because they can only give a relatively small number of view zones (e.g. the object appears to "jump" in 3D as the viewer moves between view zones). Moreover, in order to obtain these results, displays with optical elements are often used. Each view is produced by spatially multiplexing the available display pixels (LCD or projected), thereby trading off the number of distinct views/view zones and spatial resolution. For multi-screen solutions, it is not entirely easy to reconfigure the system to other display configurations or to flow content across the screens. The display system may also be a full autostereoscopic continuous view 3D system.

Figure 4:
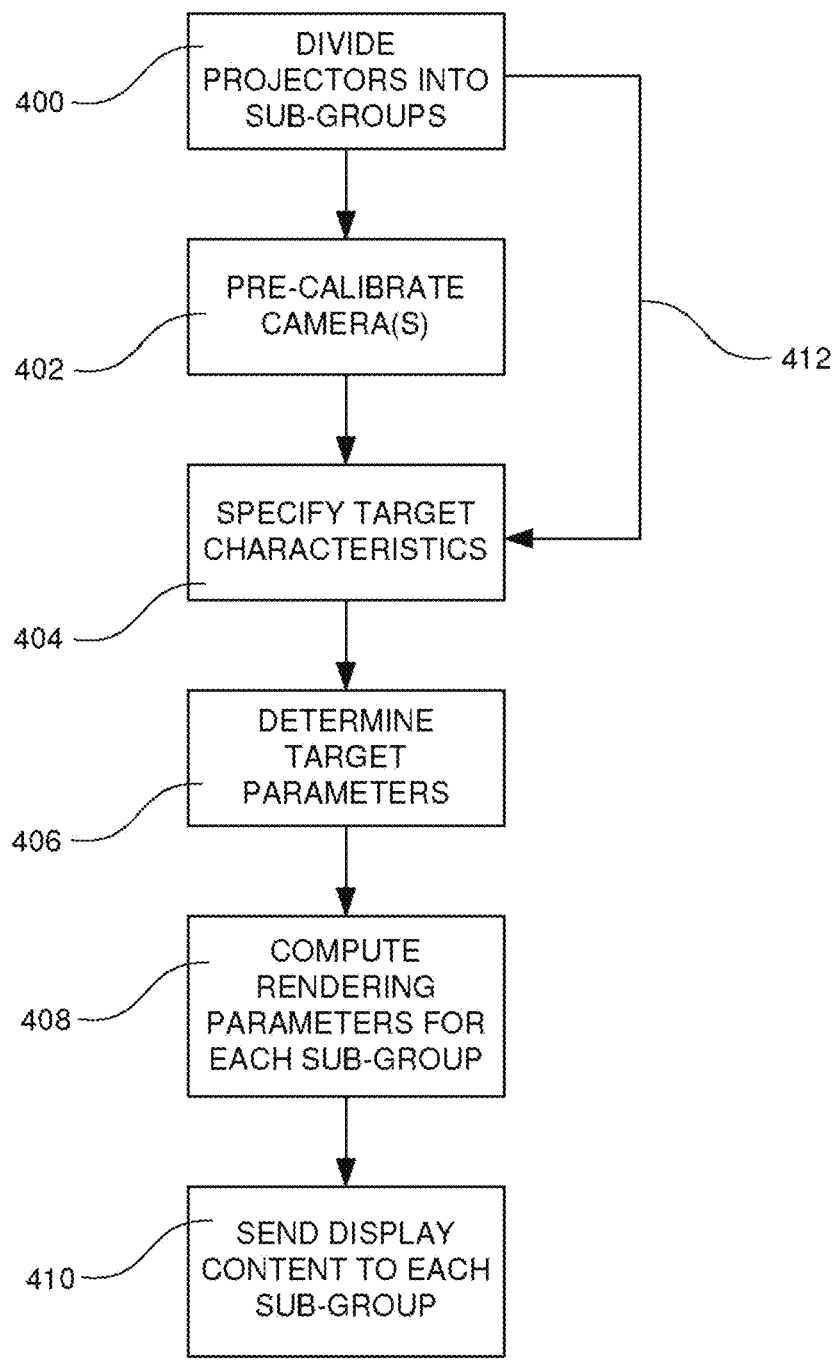
FIG. 4 is a flow diagram illustrating a method for producing a consistent composite image across multiple displays or multiple channels on the same display using a common microprocessor control system according to one embodiment.

Shown in FIG. 4 is a flow diagram illustrating a method for producing consistent composite image characteristics across multiple displays or multiple channels on the same display using a common microprocessor control system according to one embodiment. In this method, the display system is assumed to be a multi-projector display system like that shown and described in any of FIGS. 1-3, consisting of a collection of projectors, multiple graphic cards, one or more PCs clustered together, one or more calibration cameras, and one or more display surfaces. The system could be easily configured to display multiple screens simultaneously (displaying different content or even related content).

The first step 400 in the method is to divide the projectors into physical sub-groups. The multi-projector system disclosed herein includes at least two sub-groups of at least one projector each. However, different numbers of projectors per sub-group and different numbers of sub-groups can be used. For example, the system shown in FIG. 3 includes three sub-groups of three projectors. It will be appreciated that the sub-groups in a given multi-projector system can have different numbers of projectors in the sub-groups. For example, a system with eight projectors can be divided into two sub-groups with three projectors each, and a third sub-group with two projectors.

The projectors are grouped to cover the different screens or channels that are associated with the multi-projector system. Each projector is assigned to exactly one sub-group at any one time, though of course the system can be reconfigured when desired to reassign the projectors to different sub-groups. As noted above, the display system uses centralized resources (cameras, PCs, etc), and can be front- or rear-projected or both. Mixed projector technologies can also be used. For example, some projectors in the system can be LCD projectors, while others are DMD devices.

Once the projectors have been mapped to the different sub-groups, the next step 402 can be to pre-calibrate the calibration camera(s) to account for differences from the underlying mathematical model. In one embodiment, an amount of lens distortion for each calibration camera, as well as the relative orientation and position of each camera, is calculated using a known calibration pattern or chart. Once computed, the control system can precompensate each subsequently captured image to account for the lens distortion and relative geometry. The color space of the camera can also be corrected by pre-calibrating the camera using a device like a spectrophotometer, and then pre-compensating captured images with color transformations.

In another embodiment, the vignetting effect is estimated and eliminated for each calibration camera. As will be appreciated by those of skill in the art, light intensity detection can vary across the field of view of a given camera. In particular, there can be a reduction in light intensity detection at the margins of the image. It is desirable to compensate for this "vignetting" effect (also called a luminance profile or intensity profile) for each camera. This compensation is often performed by using a flat white physical target of known intensity characteristics. By viewing that pattern with each calibration camera and measuring the luminance intensity variation of the resulting image via the calibration unit, this allows the system to estimate the intensity vignetting based upon spatial variation of intensity detection across the calibration pattern image. Once the intensity variation is known, the control system can post-compensate each subsequently captured image, so that all images captured by that camera will not suffer from the vignetting effect. In this way, the camera(s) become pre-calibrated to give accurate comparative intensity readings.

As suggested by arrow 412 in FIG. 4, the process can move from step 400 to step 404, without pre-calibrating the cameras. Whether the camera(s) are pre-calibrated or not, the next step 404 is to specify the target characteristics between the sub-groups of projectors. Target characteristics for each sub-group are specified with respect to one or more of the other sub-groups. For example, it is desirable that the luminance profile and color gamut of sub-group #1 and sub-group #2 be similar, or at least consistent. As another example, it can be desirable for the sub-groups to conform to the same reference bounding box (e.g. for stereo 3D output). Thus, this step involves identifying the parameters and the constraint function(s) relating the projector sub-groups.

In some cases, this step involves first using modeling and measurement steps for each sub-group. Examples of these modeling and measurement steps include calibrating the projection brightness of each sub-group to be as uniform as possible. In one embodiment, the image pipeline for the multi-projector system uses a sophisticated image formation model and automatic measurement steps via feedback through the calibration camera(s), including measuring the inter-projector geometry, luminance, color, black offset, etc. These modeling and measurement steps are outlined in N. Damera-Venkata, N. L. Chang, J. M. DiCarlo, "A Unified Paradigm for Scalable Multi-Projector Displays," IEEE Transactions on Visualization and computer Graphics, November-December 2007, and in U.S. Pat. Nos. 7,306,341, and 7,443,364, and United States Patent Application Publication Nos. 2007/0091277, 2007/0097334, 2008/0002160, 2008/0024469, 2008/0024683, and 2008/0143978, the disclosures of which are incorporated by reference herein.

As described in the above references, a series of patterns are projected by a set of projectors and subsequently captured by the camera(s) to estimate the calibration parameters with respect to the imaging model. In one embodiment, based on the linearity of light, the model is a summation of each projector's light output, after undergoing any geometric transformations, resampling, luminance variations, color gamut changes, as well as inherent light leakage (or black offset). Once estimated, the calibration parameters facilitate an accurate prediction of the projectors' final image. As described in the above references, desired target parameters (e.g. luminance profile for the entire projector system, color gamut, etc) are chosen for the set of projectors, and rendering parameters for each projector are optimized based on the desired target parameters. The rendering parameters encapsulate the information needed to make each sub-group appear as though the output came from a single projector (i.e. so that the output appears seamless and achieves certain desired image properties). For example, this approach helps ensure that the geometry, luminance, and color of the resulting image are consistent throughout the set of projectors. In the system and method disclosed herein, each sub-group of projectors undergoes this modeling and measurement process.

Once the target characteristics for the sub-groups have been specified, the next step 406 is to determine the target parameters (brightness, color, etc) for each sub-group to ensure consistent rendering across all sub-groups. In other words, projection values for brightness, color, etc. are assigned to the projectors in the different sub-groups so that the final projected images are consistent between sub-groups with respect to these parameters. In the example of multi-channel stereoscopic 3D, this step can include scaling down the brighter of the two target luminance surfaces corresponding to the "left" and "right" sub-groups. Normally with multiple projectors there can be brightness discontinuities and seams, etc. In order to make the output from multiple individual projectors appear as if it came from a single projector, one with a particular smoothly varying luminance surface/profile, the target luminance surface of one sub-group may be substantially brighter than one obtained for a second sub-group, so this would also need to be factored in during calibration.

As another example, the system can examine the chromaticity of the projectors in each sub-group and take the intersection gamut of the color space of all the projectors in each sub-group to ensure that all content can be feasible in color. After the above measuring and modeling steps are performed for each sub-group, the resulting calibration parameters are adjusted so that the color gamut of one sub-group does not vary significantly from a second one, thereby ensuring consistency across sub-groups. The calibration camera captures these images, and the calibration unit analyzes the chromaticity of the respective projector to determine the full range of color values that the projector can produce. When this is done for all projectors, the intersection gamut represents the full range of color values that all projectors can produce. Information regarding the intersection gamut of available colors can be used to allow the system to select color values that are within the available color space for any projection color values that may fall outside that space. This allows a color that cannot be accurately rendered by all projectors to be adjusted to the closest color within the common color space, so that all sub-groups project the same color for a given color value.

Following the determination of the target parameters for the different sub-groups, the next step 408 is to compute the rendering parameters for the entire system using the parameters for each sub-group. For the purposes of rendering, each sub-group is regarded as a separate "display". The multi-projector system computes the projection differences among the projectors in a given sub-group and then solves for the parameters needed to adjust each projector so that when combined, the final result looks seamless and exhibits the desired target characteristics. In one embodiment, a training algorithm is executed to efficiently compute these rendering parameters. This process is outlined in U.S. Patent Application Publication No. 2008/0024469.

In the last step 410 shown in FIG. 4, appropriate display content is sent to each projector in each sub-group at display time. When it is desired to display some content, the computed rendering parameters are applied to every desired frame to determine how to adjust each projector's image so that when projected in the sub-group configuration, the resulting image achieves the desired characteristics. Because of the foregoing calibration steps, the system can display distinct, related, or identical content via each sub-group, with consistent display characteristics in each sub-group. In this way, one can treat a multi-screen display as a connected display where the content can flow across the sub-groups. Likewise, in the stereoscopic/3D display case, the appropriate content will be displayed in sync to the correct viewers' eyes with consistent characteristics.

Figure 5:
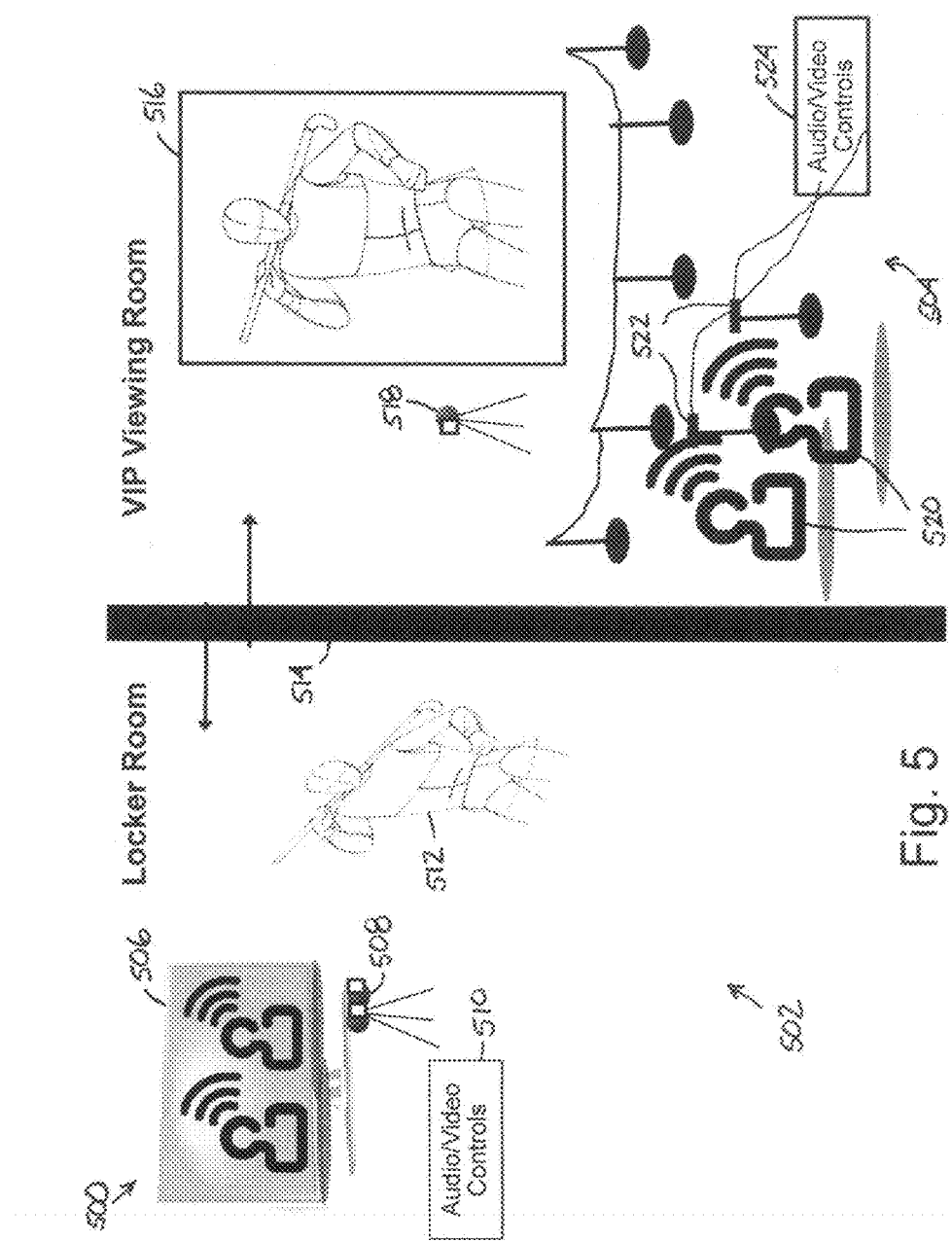
FIG. 5 is a diagram illustrating a system for providing a two-way (full-duplex) interactive 3D experience according to one embodiment.
Figure 6:
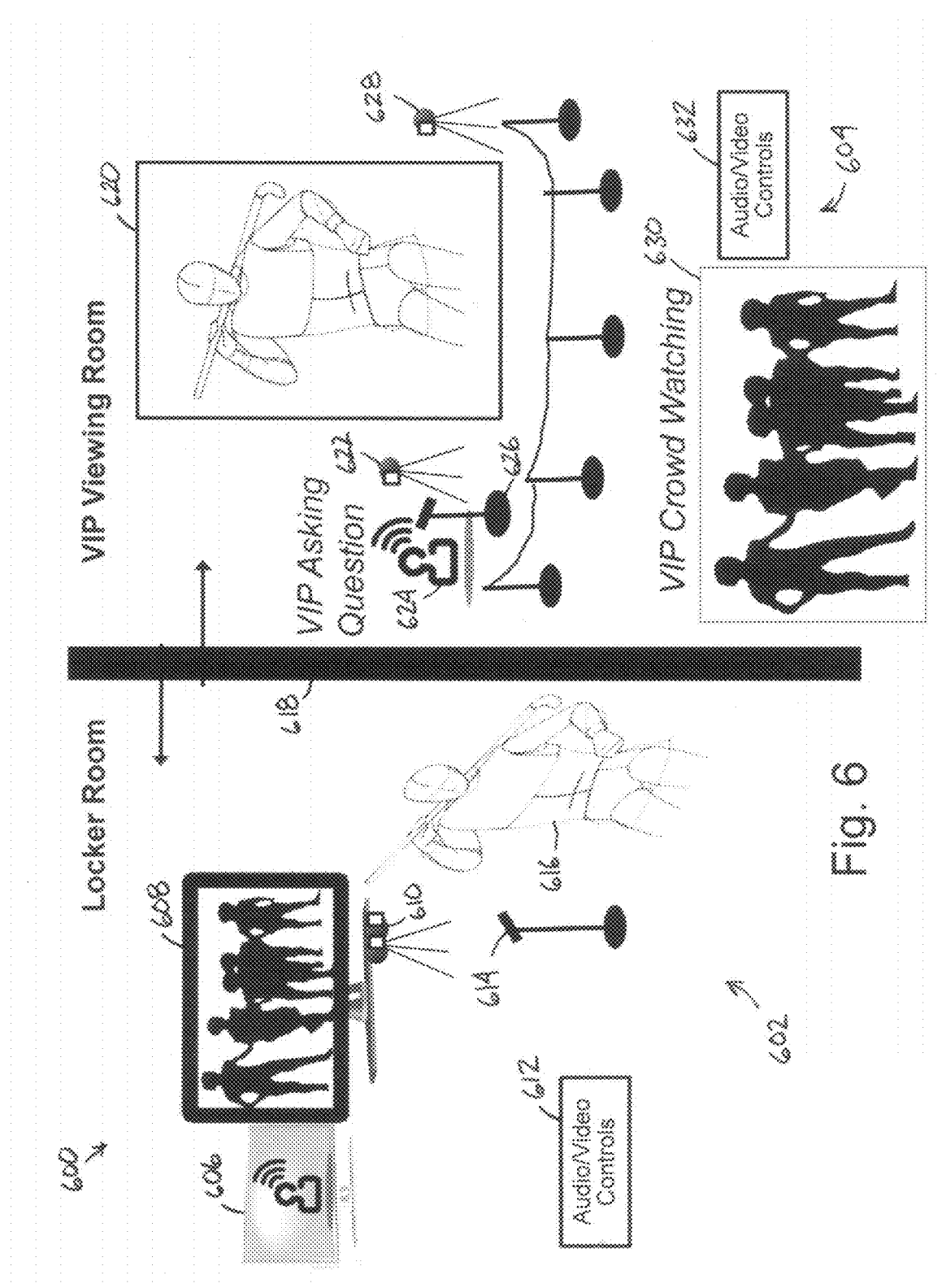
FIG. 6 is a diagram illustrating a system for providing a two-way interactive 3D experience according to another embodiment.
Figure 7:
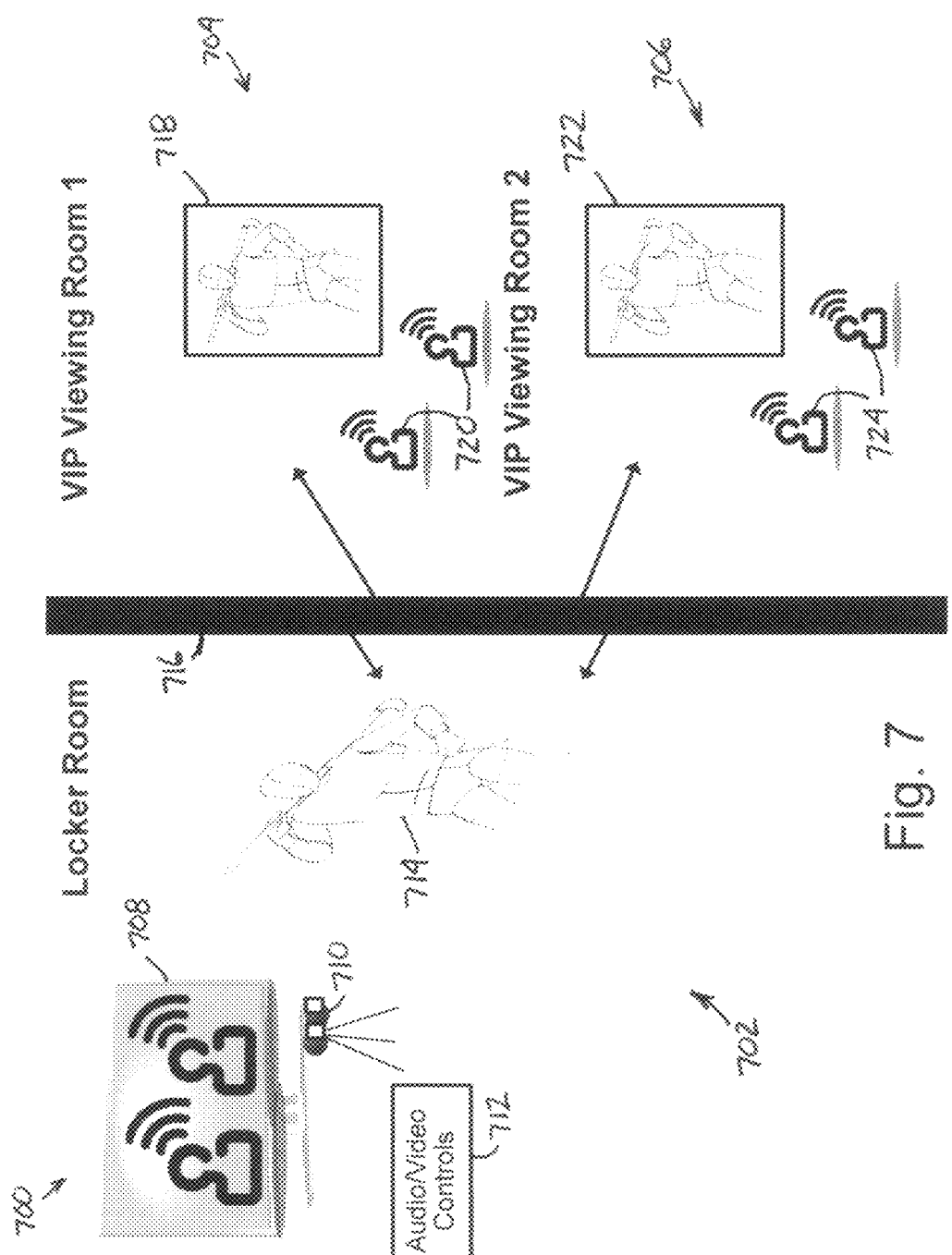
FIG. 7 is a diagram illustrating a system for providing a two-way interactive 3D experience according to yet another embodiment.

One embodiment uses a multi-projector display system, such as those shown in FIGS. 1-3 and described above, to help provide a two-way interactive 3D experience for a user. FIGS. 5-7 show embodiments of a system for providing such an interactive 3D experience.

FIG. 5 is a diagram illustrating a system 500 for providing a two-way (full-duplex) interactive 3D experience according to one embodiment. In the illustrated embodiment, the system 500 includes a first set of elements in a first room (e.g., a locker room) 502 and a second set of elements in a second room (e.g., a VIP viewing room) 504. The first set of elements in the first room 502 are communicatively coupled to the second set of elements in the second room 504 via a two-way communication link 514. In one embodiment, the communication link 514 is a fiber video network (e.g., multiple fiber/HD-SDI links) or a data network. In one embodiment, rooms 502 and 504 are at geographically dispersed locations.

The first room 502 includes a display 506, a video capture device 508, and audio/video controls 510. In one embodiment, the display 506 is a 2D Liquid Crystal Display (LCD) display device, and the video capture device 508 is a high-definition (HD) 3D video capture device that is configured to capture HD 3D images of a person (e.g., a professional athlete) 512 and capture associated audio. In another embodiment, display device 506 is a 3D display device. The second room 504 includes a display 516, a video capture device 518, audio input devices 522, and audio/video controls 524. In one embodiment, the display 516 includes a multi-projector image display system, such as system 100 shown in FIG. 1, which is configured to display HD 3D images and output associated audio. The HD 3D images captured by device 508 are transmitted to display 516 via communication link 514, and the captured images are displayed on display 516. In one embodiment, the video capture device 518 is a 2D video capture device that is configured to capture 2D video images of one or more persons (e.g., VIPs) 520 and associated audio. The 2D video images and audio captured by device 518 are transmitted to display 506 via communication link 514, and the captured images are displayed on display 506. In another embodiment, the video capture device 518 is a 3D video capture device. Audio input devices 522 are configured to capture audio information, which is transmitted to display 506 for output by display 506.

Audio/video controls 510 in room 502 are configured to control the capture and output of audio and video information by capture device 508 and display 506, and control the exchange of audio and video information with the elements of room 504. Audio/video controls 524 in room 504 are configured to control the capture and output of audio and video information by capture device 518 and display 516, and control the exchange of audio and video information with the elements of room 502. The audio/video controls 510 and 524 may also be used to help synchronize the video and audio channels, as well as reduce/cancel echo. Spatial audio may also be included so that, for example, person 512 can determine who is talking. The system may also be configured to allow VIPS 520 to view and interact with multiple professional athletes 512 at one time.

In one embodiment, display 516 provides a life-sized, life-like, and natural aspect ratio celebrity wall experience for immersive entertainment. The two-way 3D celebrity wall enables a sports athlete or artist to talk to fans virtually, as though just like being there. Display 516 according to another embodiment includes a life-sized, superwide display that provide a just-like-being-there 3D courtside experience at a basketball game or a life-sized display that demonstrates various 3D views of a clothing line for fashion/retail.

To achieve the life sizes for an immersive 3D display, one embodiment of display 516 uses multiple projectors to create a high quality, high resolution, seamless, and yet cost effective solution. Similarly, video capture device 508 is used to capture imagery with appropriate resolution and aspect ratio. In one embodiment, display 516 displays images of people and objects at between about 80% to 120% of the actual size of these people and objects.

System 500 allows special guests (e.g., VIPs 520) the opportunity to interact with talent (e.g., professional athlete 512) in ways they have never experienced before. Utilizing a substantially life-sized display 516 and a 3D video capture device 508, when the special guests interact with the talent, they will have a true-to-life experience and the feeling of actually meeting them in-person, without the talent actually being in the same location.

In one embodiment, display 516 has a size and aspect ratio that are appropriate for the talent. For example, in one embodiment, the display 516 is about 5'×8' to create a life-like experience of interacting with a professional athlete. In other embodiments, the display 516 is a 1:1 ratio (e.g., 8'×8'), which may be more appropriate for situations in which a VIP is viewing multiple athletes/celebrities at the same time. The display 516 creates a seamless 3D display in the appropriate aspect ratio. Geometric and color differences among the projectors in display 516 are automatically corrected to deliver a high quality result. Likewise, on the celebrity side (i.e., in room 502), video capture device 508 includes two or more cameras to form the appropriate 3D imagery in an appropriate aspect ratio. For example, for a more portrait oriented display, two portrait oriented high-definition (HD) cameras are used to capture portrait oriented HD 3D imagery.

FIG. 6 is a diagram illustrating a system 600 for providing a two-way (full-duplex) interactive 3D experience according to another embodiment. In the illustrated embodiment, the system 600 includes a first set of elements in a first room (e.g., a locker room) 602 and a second set of elements in a second room (e.g., a VIP viewing room) 604. The first set of elements in the first room 602 are communicatively coupled to the second set of elements in the second room 604 via a two-way communication link 618. In one embodiment, the communication link 618 is a fiber video network (e.g., multiple fiber/HD-SDI links) or a data network. In one embodiment, rooms 602 and 604 are at geographically dispersed locations.

The first room 602 includes displays 606 and 608, a video capture device 610, audio/video controls 612, and audio input device 614. In one embodiment, displays 606 and 608 are 2D LCD displays, and the video capture device 610 is a high-definition (HD) 3D video capture device that is configured to capture HD 3D video images of a person (e.g., a professional athlete) 616. In another embodiment, displays 606 and 608 are 3D display devices. Displays 606 and 608 may also be implemented with a single physical display device (e.g., by displaying multiple windows on the single display device). Audio input device 614 is configured to capture audio from person 616. The second room 604 includes a display 620, video capture devices 622 and 628, audio input device 626, and audio/video controls 632. In one embodiment, the display 620 includes a multi-projector image display system, such as system 100 shown in FIG. 1, which is configured to display HD 3D images and output associated audio. The HD 3D images captured by device 610 are transmitted to display 620 via communication link 618, and the captured images are displayed on display 620.

In one embodiment, the video capture device 622 is a 2D video capture device that is configured to capture 2D video images of one or more persons (e.g., VIP) 624 and associated audio. The 2D video images and audio captured by device 622 are transmitted to display 606 via communication link 618, and the captured images are displayed on display 606. In one embodiment, the video capture device

628 is a 2D video capture device that is configured to capture 2D video images of one or more persons (e.g., VIP crowd) 630 and associated audio. The 2D video images and audio captured by device 628 are transmitted to display 608 via communication link 618, and the captured images are displayed on display 608. In another embodiment, one or both of video capture devices 622 and 628 are 3D video capture devices. Audio input device 626 is configured to capture audio information, which is transmitted to display 606 for output by display 606.

Audio/video controls 612 in room 602 are configured to control the capture and output of audio and video information by capture device 610 and displays 606 and 608, and control the exchange of audio and video information with the elements of room 604. Audio/video controls 632 in room 604 are configured to control the capture and output of audio and video information by capture devices 622 and 628 and display 620, and control the exchange of audio and video information with the elements of room 602. The audio/video controls 612 and 632 may also be used to help synchronize the video and audio channels, as well as reduce/cancel echo. Spatial audio may also be included. The system may also be configured to allow VIPS to view and interact with multiple professional athletes at one time.

In one embodiment, display 620 provides a life-sized, life-like, and natural aspect ratio celebrity wall experience for immersive entertainment. The two-way 3D celebrity wall enables a sports athlete or artist to talk to fans virtually, as though just like being there. Display 620 according to another embodiment includes a life-sized, superwide display that provide a just-like-being-there 3D courtside experience at a basketball game or a life-sized display that demonstrates various 3D views of a clothing line for fashion/retail.

To achieve the life sizes for an immersive 3D display, one embodiment of display 620 uses multiple projectors to create a high quality, high resolution, seamless, and yet cost effective solution. Similarly, video capture device 610 is used to capture imagery with appropriate resolution and aspect ratio. In one embodiment, display 620 displays images of people and objects at between about 80% to 120% of the actual size of these people and objects.

System 600 allows special guests (e.g., VIP 624) the opportunity to interact with talent (e.g., professional athlete 616) in ways they have never experienced before. Utilizing a life-sized display 620 and a 3D video capture device 610, when the special guests interact with the talent, they will have a true-to-life experience and the feeling of actually meeting them in-person, without the talent actually being in the same location. In particular, having a question and answer area for VIP 624 to ask a question allows individualized and eye-to-eye experiences for the questioner to feel like he or she is directly interacting with the talent. Moreover, having displays 606 and 608 on the talent side allows the talent to have a sense of their fans plus the personalized experience with the questioner.

In one embodiment, display 620 has a size and aspect ratio that are appropriate for the talent. For example, in one embodiment, the display 620 is about 5'×8' to create a life-like experience of interacting with a professional athlete. The display 620 creates a seamless 3D display in the appropriate aspect ratio. Geometric and color differences among the projectors in display 620 are automatically corrected to deliver a high quality result. Likewise, on the celebrity side (i.e., in room 602), video capture device 610 includes two or more cameras to form the appropriate 3D imagery in an appropriate aspect ratio. For example, for a more portrait oriented display, two portrait oriented high-definition (HD) cameras are used to capture portrait oriented HD 3D imagery.

FIG. 7 is a diagram illustrating a system 700 for providing a two-way (full-duplex) interactive 3D experience according to yet another embodiment. In the illustrated embodiment, the system 700 includes a first set of elements in a first room (e.g., a locker room) 702, a second set of elements in a second room (e.g., a first VIP viewing room) 704, and a third set of elements in a third room (e.g., a second VIP viewing room) 706. The first set of elements in the first room 702 are communicatively coupled to the second set of elements in the second room 704 and the third set of elements in the third room 706 via a two-way communication link 716. In one embodiment, the communication link 716 is a fiber video network (e.g., multiple fiber/HD-SDI links) or a data network. In one embodiment, rooms 702, 704, and 706 are at geographically dispersed locations.

The first room 702 includes display 708, a video capture device 710, and audio/video controls 712. In one embodiment, display 708 is a 2D LCD display, and the video capture device 710 is a high-definition (HD) 3D video capture device that is configured to capture HD 3D video images of a person (e.g., a professional athlete) 714 and capture associated audio. The second room 704 includes a display 718, and the third room 706 includes a display 722. In one embodiment, the displays 718 and 722 each include a multi-projector image display system, such as system 100 shown in FIG. 1, which is configured to display HD 3D images and output associated audio. The HD 3D images captured by device 710 are transmitted to displays 718 and 722 via communication link 716, and the captured images are displayed on displays 718 and 722. In one embodiment, each of the rooms 704 and 706 includes a video capture device (not shown in FIG. 7) that is configured to capture 2D video images of one or more persons (e.g., VIPs) 720 and 724 and associated audio. The 2D video images and audio captured by these devices are transmitted to display 708 via communication link 716, and the captured images are displayed on display 708.

Audio/video controls 712 in room 702 are configured to control the capture and output of audio and video information by capture device 710 and display 708, and control the exchange of audio and video information with the elements of room 704. In one embodiment, rooms 704 and 706 include similar audio/video controls.

In one embodiment, displays 718 and 722 provide a life-sized, life-like, and natural aspect ratio celebrity wall experience for immersive entertainment. The two-way 3D celebrity wall enables a sports athlete or artist to talk to fans virtually, as though just like being there. Displays 718 and 722 according to another embodiment includes a life-sized, superwide display that provide a just-like-being-there 3D courtside experience at a basketball game or a life-sized display that demonstrates various 3D views of a clothing line for fashion/retail. In some embodiments, the displays are co-located to create a gathering of geographically dispersed members. An example is a music jam session or interview where there are two 3D life-sized displays on stage for two geographically dispersed musicians or interviewees, and where an audience could watch (led by a moderator). This would provide a natural experience for the moderator and audience as well as the two geographically dispersed members. It could be structured so that the right visual and social cues would create the right experience for all parties.

To achieve the life sizes for an immersive 3D display, one embodiment of displays 718 and 722 uses multiple projectors to create a high quality, high resolution, seamless, and yet cost effective solution. Similarly, video capture device 710 is used to capture imagery with appropriate resolution and aspect ratio. In one embodiment, displays 718 and 722 display images of people and objects at between about 80% to 120% of the actual size of these people and objects.

System 700 allows special guests (e.g., VIPs 720 and 724) the opportunity to interact with talent (e.g., professional athlete 714) in ways they have never experienced before. Utilizing life-sized displays 718 and 722 and a 3D video capture device 710, when the special guests interact with the talent, they will have a true-to-life experience and the feeling of actually meeting them in-person, without the talent actually being in the same location.

In one embodiment, displays 718 and 722 have a size and aspect ratio that are appropriate for the talent. For example, in one embodiment, the displays 718 and 722 are each about 5'×8' to create a life-like experience of interacting with a professional athlete. The displays 718 and 722 create a seamless 3D display in the appropriate aspect ratio. Geometric and color differences among the projectors in displays 718 and 722 are automatically corrected to deliver a high quality result. Likewise, on the celebrity side (i.e., in room 702), video capture device 710 includes two or more cameras to form the appropriate 3D imagery in an appropriate aspect ratio. For example, for a more portrait oriented display, two portrait oriented high-definition (HD) cameras are used to capture portrait oriented HD 3D imagery.

It will be understood that FIGS. 5-7 are simplified representations, and that the various rooms shown in these Figures may include additional or different elements than those shown.

Figure 8:
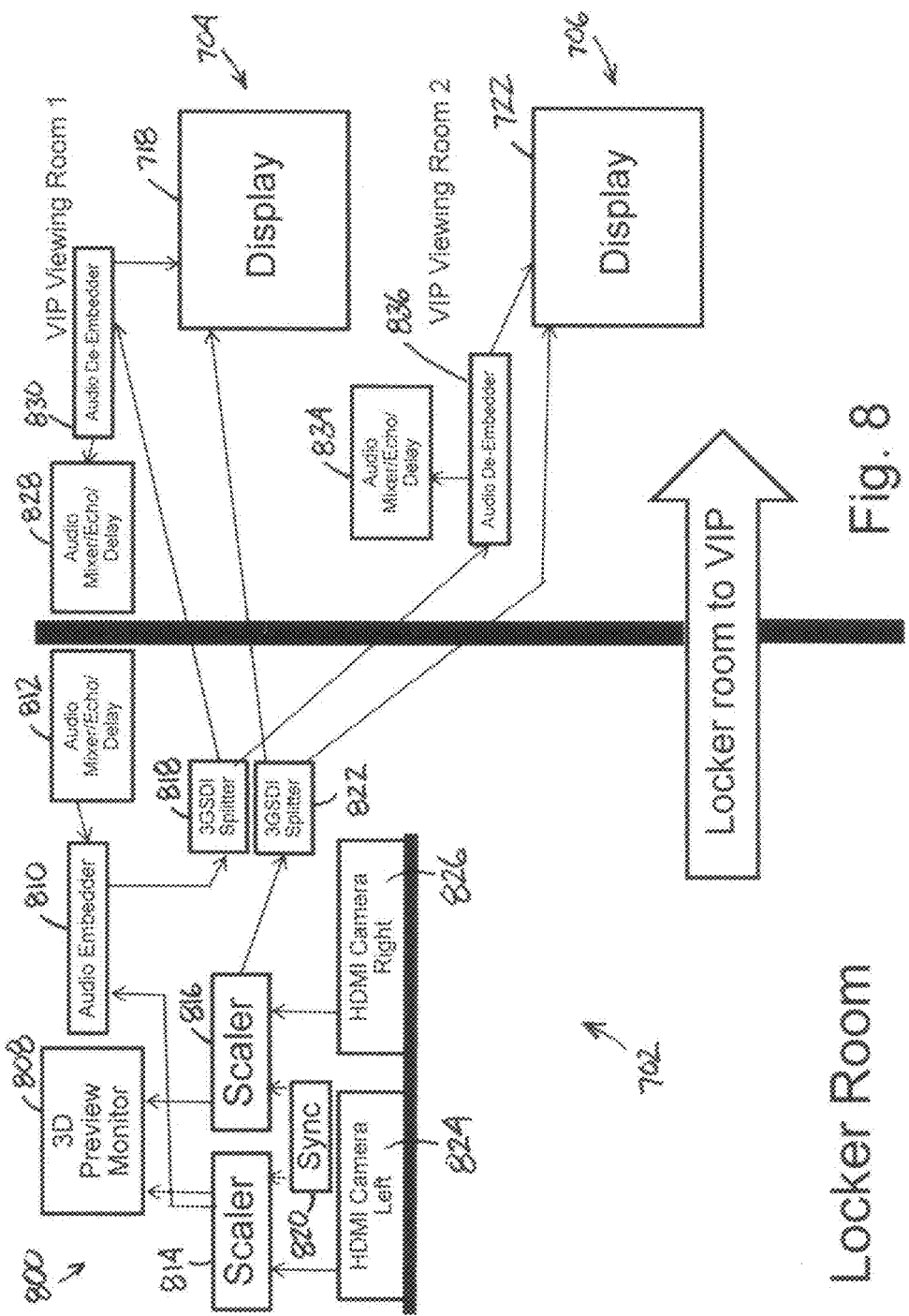
FIG. 8 is a block diagram illustrating elements of the system shown in FIG. 7 for providing audio and video information from the first room to the second and third rooms according to one embodiment.

FIG. 8 is a block diagram illustrating elements 800 of the system 700 shown in FIG. 7 for providing audio and video information from the first room 702 to the second and third rooms 704 and 706 according to one embodiment. Room 702 includes 3D preview monitor 808, audio embedder 810, audio mixer/echo/delay unit 812, scalers 814 and 816, 3GSDI splitters 818 and 822, synchronization unit 820, HDMI camera left 824, and HDMI camera right 826. Cameras 824 and 826 are represented by video capture device 710 in FIG. 7. Room 704 includes audio mixer/echo/delay unit 828, audio de-embedder 830, and display 718. Room 706 includes audio mixer/echo/delay unit 834, audio de-embedder 836, and display 722.

Cameras 824 and 824 capture left and right eye images, respectively, for generating 3D video, and provide the images to scalers 814 and 816, respectively. Synchronization unit 820 synchronizes the scalers 814 and 816. Scalers 814 and 816 scale the received images, and output the scaled images to 3D preview monitor 808 for previewing the 3D video. Scaler 814 also outputs the scaled, left-eye images to audio embedder 810. Audio embedder 810 receives associated audio from unit 812, embeds the audio in the received image stream, and outputs an audio and video stream to 3GSDI splitter 818. 3GSDI splitter 818 outputs the received audio and video stream to audio de-embedders 830 and 836. Scaler 816 outputs the scaled, right-eye images to 3GSDI splitter 822, which outputs the received images to displays 718 and 722.

Audio de-embedders 830 and 836 remove the audio from the audio and video streams received from 3GSDI splitter 818, output the audio to units 828 and 834, respectively, and output the left-eye images from the audio and video stream to displays 718 and 722, respectively. Display 718 generates a 3D display based on the left-eye images received from unit 830 and the right-eye images received from splitter 822. Similarly, display 722 generates a 3D display based on the left-eye images received from unit 836 and the right-eye images received from splitter 822. Audio mixer/echo/delay units 828 and 834 perform mixing, echo, and delay functions on the received audio prior to outputting the audio.

Figure 9:
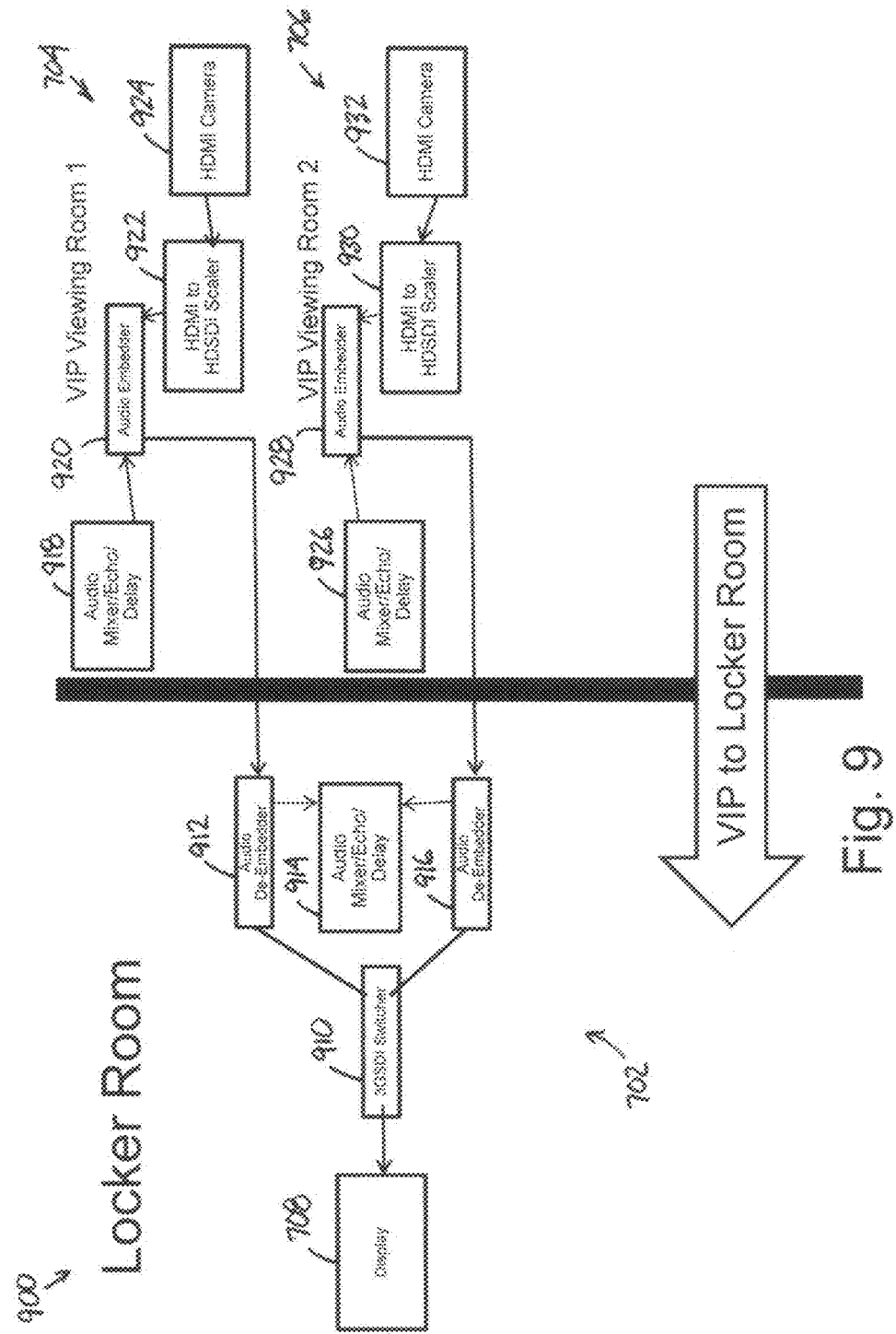
FIG. 9 is a block diagram illustrating elements of the system shown in FIG. 7 for providing audio and video information from the second room and the third room to the first room according to one embodiment.

FIG. 9 is a block diagram illustrating elements 900 of the system 700 shown in FIG. 7 for providing audio and video information from the second room 704 and the third room 706 to the first room 702 according to one embodiment. Room 702 includes display 708, 3GSDI switcher 910, audio de-embedder 912, audio mixer/echo/delay unit 914, and audio de-embedder 916. Room 704 includes audio mixer/echo/delay unit 918, audio embedder 920, HDMI to HDSDI scaler 922, and HDMI camera 924. Room 706 includes audio mixer/echo/delay unit 926, audio embedder 928, HDMI to HDSDI scaler 930, and HDMI camera 932.

HDMI camera 924 captures HD images in room 704 (e.g., of VIPs 720), and outputs the images to scaler 922. Scaler 922 scales the received images, and outputs the scaled images to audio embedder 920. Audio mixer/echo/delay unit 918 performs mixing, echo, and delay functions on the audio captured in the room 704, and outputs the audio to audio embedder 920. Audio embedder 920 adds the received audio to the received scaled images, and outputs an audio and video stream to audio de-embedder 912.

HDMI camera 932 captures HD images in room 706 (e.g., of VIPs 724), and outputs the images to scaler 930. Scaler 930 scales the received images, and outputs the scaled images to audio embedder 928. Audio mixer/echo/delay unit 926 performs mixing, echo, and delay functions on the audio captured in the room 706, and outputs the audio to audio embedder 928. Audio embedder 928 adds the received audio to the received scaled images, and outputs an audio and video stream to audio de-embedder 916.

Audio de-embedders 912 and 916 remove the audio from the received audio and video streams, provide the audio to audio mixer/echo/delay unit 914, and provide the image streams to 3GSDI switcher 910. Audio mixer/echo/delay unit 914 performs mixing, echo, and delay functions on the received audio prior to outputting the audio. Switcher 910 receives the room 704 image stream from audio de-embedder 912 and receives the room 706 image stream from audio de-embedder 916, and selectively outputs one of these streams to display 708 based on user input. Display 708 displays the selected image stream.

Figure 10:
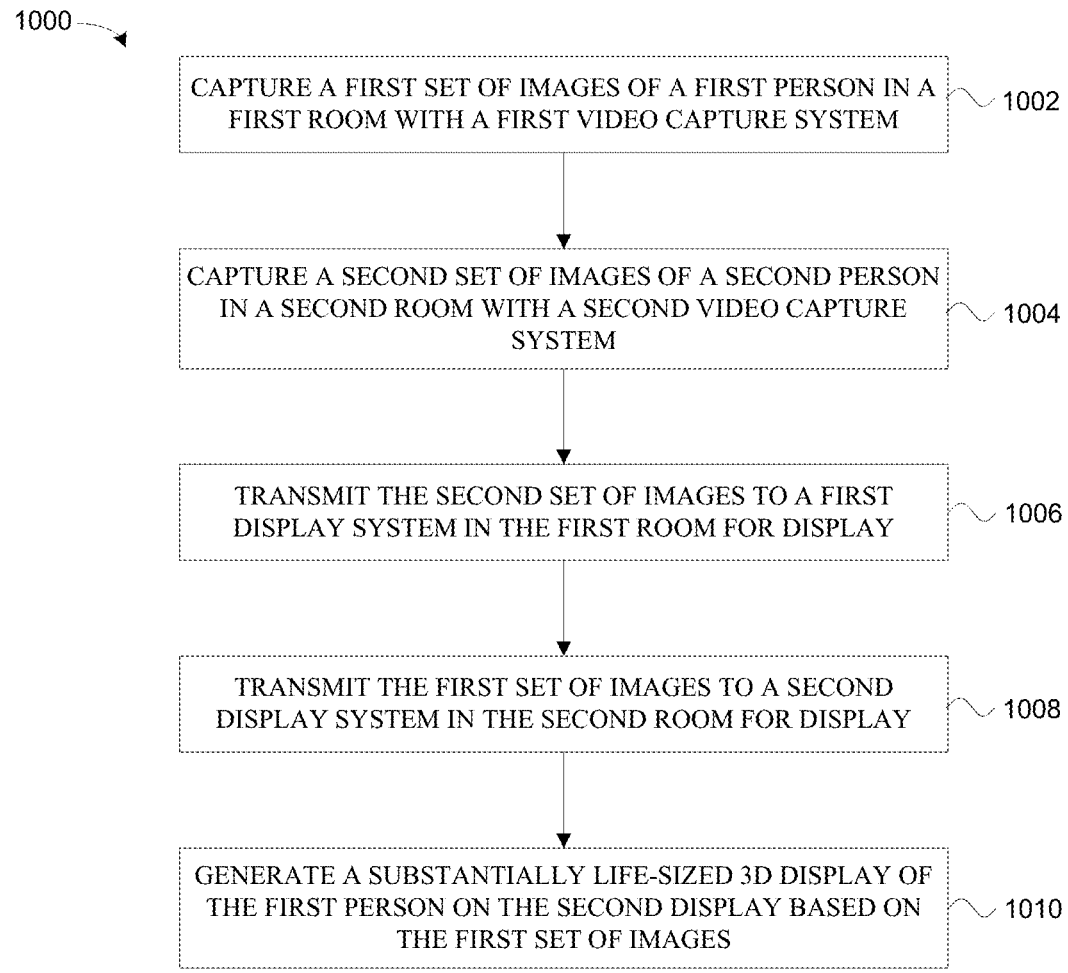
FIG. 10 is a flow diagram illustrating a method for providing a two-way interactive 3D experience according to one embodiment.

FIG. 10 is a flow diagram illustrating a method 1000 for providing a two-way interactive 3D experience according to one embodiment. At 1002, a first set of images of a first person in a first location (e.g., room) is captured with a first video capture system. At 1004, a second set of images of a second person in a second location (e.g., room) is captured with a second video capture system. At 1006, the second set of images is transmitted to a first display system in the first room for display. At 1008, the first set of images is transmitted to a second display system in the second room for display. At 1010, a substantially life-sized 3D display of the first person is generated on the second display based on the first set of images.

In one embodiment of method 1000, the first video capture system is a portrait-oriented video capture system, and the second display system is a portrait-oriented display system. The method 1000 according to one embodiment further includes displaying 3D images of the first person on the second display at between about 80% to 120% of actual size of the first person. In one embodiment, the first room and the second room are geographically dispersed. Method 1000 according to one embodiment further includes: capturing a third set of images of a third person in a third location (e.g., room) with a third video capture system; transmitting the third set of images to the first display system in the first room for display; transmitting the first set of images to a third display system in the third room for display; and generating a substantially life-sized 3D display of the first person on the third display based on the first set of images. In one embodiment of method 1000, the second display system comprises a multi-projector display system.

Another embodiment is directed to a system for providing a two-way interactive 3D experience. The system includes a first video capture system configured to capture a first set of images of a first person in a first location, and a first display system in the first location. A second video capture system is configured to capture a second set of images of a second person in a second location. A second display system is in the second location. A two-way communication link is configured to deliver the first set of images to the second display system for display and deliver the second set of images to the first display system for display. The second display system is configured to generate a substantially life-sized 3D display of the first person based on the first set of images.

In one form of this embodiment, the first video capture system is a portrait-oriented video capture system, and the second display system is a portrait-oriented display system. The second display system according to one embodiment is configured to display images of the first person at between about 80% to 120% of actual size of the first person. In one embodiment, the first location and the second location are geographically dispersed.

In one embodiment, the system includes a third video capture system configured to capture a third set of images of a third person in a third location, and a third display system in the third location. The communication link is configured to deliver the first set of images to the third display system for display and deliver the third set of images to the first display system for display. The third display system is configured to generate a substantially life-sized 3D display of the first person based on the first set of images.

In one embodiment of the system, the second display system comprises a multi-projector display system. In one form of this embodiment, the first set of images comprises a first channel of stereoscopic 3D display data and a second channel of stereoscopic 3D display data, and the multi-projector display system includes: a first sub-group of projectors configured to receive the first channel of stereoscopic 3D display data; and a second sub-group of projectors configured to receive the second channel of stereoscopic 3D display data. The first and second sub-groups are configured to superimposedly project images to a common display location to provide a stereoscopic 3D display. In another form of this embodiment, the first set of images comprises a first channel of 3D display data and a second channel of 3D display data, and the multi-projector display system includes: a first sub-group of projectors configured to receive the first channel of 3D display data; and a second sub-group of projectors configured to receive the second channel of 3D display data. The first and second sub-groups are configured to superimposedly project images to a common display location to provide a display having multiple views. In yet another form of this embodiment, the first set of images comprises a first channel of 3D display data and a second channel of 3D display data, and the multi-projector display system includes: a first sub-group of projectors configured to receive the first channel of 3D display data; and a second sub-group of projectors configured to receive the second channel of 3D display data. The first and second sub-groups are configured to superimposedly project images to a common display location to provide a display having full autostereoscopic continuous view 3D.

In one embodiment, the two-way communication link is configured to deliver audio information captured in the first location to the second location, and deliver audio information captured in the second location to the first location. The two-way communication link according to one embodiment comprises a fiber video network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A multi-projector display system comprising:
a display;
a receiver to receive, over a network, a set of images of an object from a video capture system, the set of images comprising a plurality of channels of three-dimensional (3D) display data; and
a plurality of groups of projectors to receive respective channels of 3D display data of the plurality of channels of 3D display data, wherein the plurality of groups of projectors comprises a first group of projectors to receive a first channel of 3D display data of the plurality of channels of 3D display data, and a second group of projectors to receive a second channel of 3D display data of the plurality of channels of 3D display data, the plurality of groups of projectors to superimpose projected images corresponding to the plurality of channels of 3D display data onto a common display location of the display to generate a substantially life-sized 3D image of the object on the display.

2. The multi-projector system of claim 1, wherein the object is a person and the set of images is of the person, and wherein the generated substantially life-sized 3D image has a size that is at least 80% of an actual size of the person.

3. The multi-projector system of claim 2, wherein the size of the generated substantially life-sized 3D image is at between about 80% to 120% of the actual size of the person.

4. The multi-projector system of claim 1, wherein the plurality of groups of projectors are to superimpose projected images corresponding to the plurality of channels of 3D display data onto the common display location of the display to generate multiple views of the substantially life-sized 3D image of the object on the display.

5. The multi-projector system of claim 1, wherein the plurality of groups of projectors are to superimpose projected images corresponding to the plurality of channels of 3D display data onto the common display location of the display to generate a stereoscopic display of the substantially life-sized 3D image of the object.

6. The multi-projector system of claim 1, wherein the receiver is to receive the set of images from the video capture system that is a portrait-oriented video capture system.

7. The multi-projector system of claim 6, wherein the display has a portrait orientation to display the substantially life-sized 3D image of the object in the portrait orientation.

8. The multi-projector system of claim 1, wherein the plurality of channels of 3D display data comprise a first channel of stereoscopic 3D display data and a second channel of stereoscopic 3D display data, and wherein the plurality of groups of projectors are to superimpose projected images corresponding to the plurality of channels of 3D display data onto the common display location of the display to generate a stereoscopic display of the substantially life-sized 3D image of the object.

9. The multi-projector system of claim 1, wherein the plurality of groups of projectors are to superimpose projected images corresponding to the plurality of channels of 3D display data onto the common display location of the display to generate a full autostereoscopic display of the substantially life-sized 3D image of the object.

10. The multi-projector system of claim 1, wherein the video capture system is a first video capture system at a first geographic location, the multi-projector system further comprising a second video capture system at a second geographic location to capture a set of images of a person at the second geographic location, and to communicate the set of images of the person at the second geographic location over the network to a receiver at the first geographic location to cause display of an image of the person at a display at the first geographic location.

11. The multi-projector system of claim 10, wherein the receiver is to receive, over the network, audio data captured by a microphone at the first geographic location, the multi-projector system further comprising:
   a speaker at the second geographic location to output the received audio data.

12. The multi-projector system of claim 1, wherein the first group of projectors comprises multiple projectors, and the second group of projectors comprise multiple projectors, the first group different from the second group.

13. A method comprising:
   receiving, by a multi-projector display system over a network, a set of images of an object captured by a video capture system, the set of images comprising a plurality of channels of three-dimensional (3D) display data;
   receiving, by a plurality of groups of projectors of the multi-projector display system, respective channels of 3D display data of the plurality of channels of 3D display data, wherein the plurality of groups of projectors comprise a first group of projectors receiving a first channel of 3D display data of the plurality of channels of 3D display data, and a second group of projectors receiving a second channel of 3D display data of the plurality of channels of 3D display data; and
   superimposing, by the plurality of groups of projectors, projected images corresponding to the plurality of channels of 3D display data onto a common display location of a display of the multi-projector display system to generate a substantially life-sized 3D image of the object on the display.

14. The method of claim 13, wherein the object is a person, and wherein the substantially life-sized 3D image of the person has a size that is at least 80% of an actual size of the person.

15. The method of claim 13, wherein the superimposing by the plurality of groups of projectors of the projected images corresponding to the plurality of channels of 3D display data onto the common display location of the display generates multiple views of the substantially life-sized 3D image of the object on the display.

16. The method of claim 13, wherein the superimposing by the plurality of groups of projectors of the projected images corresponding to the plurality of channels of 3D display data onto the common display location of the display to generate a stereoscopic display of the substantially life-sized 3D image of the object.

17. The method of claim 13, wherein the video capture system is a portrait-oriented video capture system, and the display has a portrait orientation to display the substantially life-sized 3D image of the object in the portrait orientation.

18. The method of claim 13, wherein the video capture system is located at a first geographic location, and the multi-projector display system is located at a second geographic location, the method further comprising:
   capturing, by a video capture system at the second geographic location, images of a person at the second geographic location; and
   sending, over the network, the images of the person to a receiver at the first geographic location to display the images at a display at the first geographic location.

19. The method of claim 13, wherein the first group of projectors comprises multiple projectors, and the second group of projectors comprise multiple projectors, the first group different from the second group.

* * * * *